United States Patent [19]
Shepter

[11] 4,101,816
[45] Jul. 18, 1978

[54] SWITCH CONTROL SYSTEM

[75] Inventor: Joseph J. Shepter, New Haven, Conn.

[73] Assignee: Vibra-Metrics, Inc., East Haven, Conn.

[21] Appl. No.: 738,344

[22] Filed: Nov. 3, 1976

[51] Int. Cl.$^2$ ............................................. H02K 33/00
[52] U.S. Cl. ..................................... 318/130; 318/128; 318/132; 363/28
[58] Field of Search ................................. 318/114–134; 363/28

[56] References Cited

U.S. PATENT DOCUMENTS

| | | | |
|---|---|---|---|
| 2,892,140 | 6/1959 | Praeg | 318/132 X |
| 3,122,690 | 2/1964 | Dion et al. | 318/132 X |
| 3,147,419 | 9/1964 | Cope | 318/129 |
| 3,163,808 | 12/1964 | Peterson, Jr. | 318/130 |
| 3,316,470 | 4/1967 | Scott | 318/130 |
| 3,331,239 | 7/1967 | Larsen et al. | 318/130 X |
| 3,649,893 | 3/1972 | Lajoie | 318/132 X |
| 3,787,715 | 1/1974 | Eaton, Jr. | 318/130 |
| 3,947,746 | 3/1976 | Heinicke | 363/28 |

Primary Examiner—Donovan F. Duggan

[57] ABSTRACT

A switch control system particularly well suited for use in a electromechanical vibrator drive. Solid-state switches and diodes are used in combination with a DC power supply to alternately switch energy between the electric field of the power supply filter capacitor and the magnetic field of the actuator coil of a vibrator in a power resonant mode. The control system includes a variable frequency oscillator and a controllable pulse generator which respectively provide signals for controlling the closing and opening of the switches whereby the frequency and amplitude of movement of a vibratory feeder may be adjusted.

24 Claims, 4 Drawing Figures

SWITCH CONTROL SYSTEM

BACKGROUND OF THE INVENTION (1) Field of the Invention

The present invention relates to the exercise of control over the periodic delivery of current to a load and particularly an inductive load. More specifically, this invention is directed to apparatus for controlling the opening and closing of solid-state switch devices through which current is delivered to a load and especially to a drive system for vibratory feeders which include an electromechanical actuator. Accordingly, the general objects of the present invention are to provide novel and improved methods and apparatus of such character.

(2) Description of the Prior Art

While not limited thereto in its utility, the present invention is particularly well suited for use as a drive system for an electromagnetic vibrator and specifically a feed control drive which has the capability of adjusting the amplitude and frequency of the driven mechanism. Drive systems for electromagnetic vibrators are well known in the art. The prior art drive systems include the non-power resonant type, as exemplified by U.S. Pat. No. 3,922,589, and the power resonant type; the present invention being concerned with power resonant drive systems.

Prior art vibrator feed drives, whether power resonant or non-resonant, suffered from common deficiencies. The foremost deficiency resulted from the use of transistors as the main current switching devices. As is well known, transistors are susceptible to destruction as a result of line transients and are limited in the output power which can be obtained. Additionally, prior art attempts to provide a start-up delay, wherein feed drive would be precluded until system voltages had stabilized, had been characterized by complexity and lack of reliability.

SUMMARY OF THE INVENTION

The present invention overcomes the above briefly discussed and other deficiencies and disadvantages of the prior art by providing a novel and improved circuit for periodically connecting a direct current source to an inductive load. This periodic connection is accomplished through the use of silicon controlled rectifiers as the switching devices and a power resonant mode of operation is accomplished through the use of diodes which return energy from the load to the filter capacitor of the power supply when the silicon controlled rectifiers are in the non-conductive state. In accordance with a preferred embodiment a pair of silicon controlled rectifiers and the inductive load are connected in series across the power supply, with the load being positioned in the circuit between the rectifier devices, and opposite sides of the load are connected to the opposite terminals of the power supply by means of a pair of diodes.

Also in accordance with a preferred embodiment of the invention, a novel timing circuit is employed to control the switching of the silicon controlled rectifiers between their conductive and non-conductive states. This timing circuit includes an oscillator which preferably consists of a square wave generator having an adjustable output frequency. The timing circuit may also include a pulse generator which produces an output pulse of adjustable width. The leading edges of the output pulses provided by the oscillator and pulse generator are synchronized and the width of the pulse generator output pulse is adjustable. Through the use of drive and commutation control circuits the SCR's are turned on in synchronism with the leading edge of the oscillator output pulse and may be turned off in synchronism with the trailing edge of the pulse generator output pulses. Commutation of each of the silicon controlled rectifiers is achieved through the use of a circuit including a commutating capacitor and a pair of further silicon controlled rectifiers.

Also in accordance with a preferred embodiment of the invention, a novel logic circuit is employed to insure that the exchange of energy between the load and power supply cannot be undertaken if the power supply output voltage is below a preselected level. This logic circuit includes means for generating a disabling signal for the oscillator from which the main silicon controlled rectifier gating and commutation control signals are derived.

BRIEF DESCRIPTION OF THE DRAWING

The present invention will be better understood and its numerous additional objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
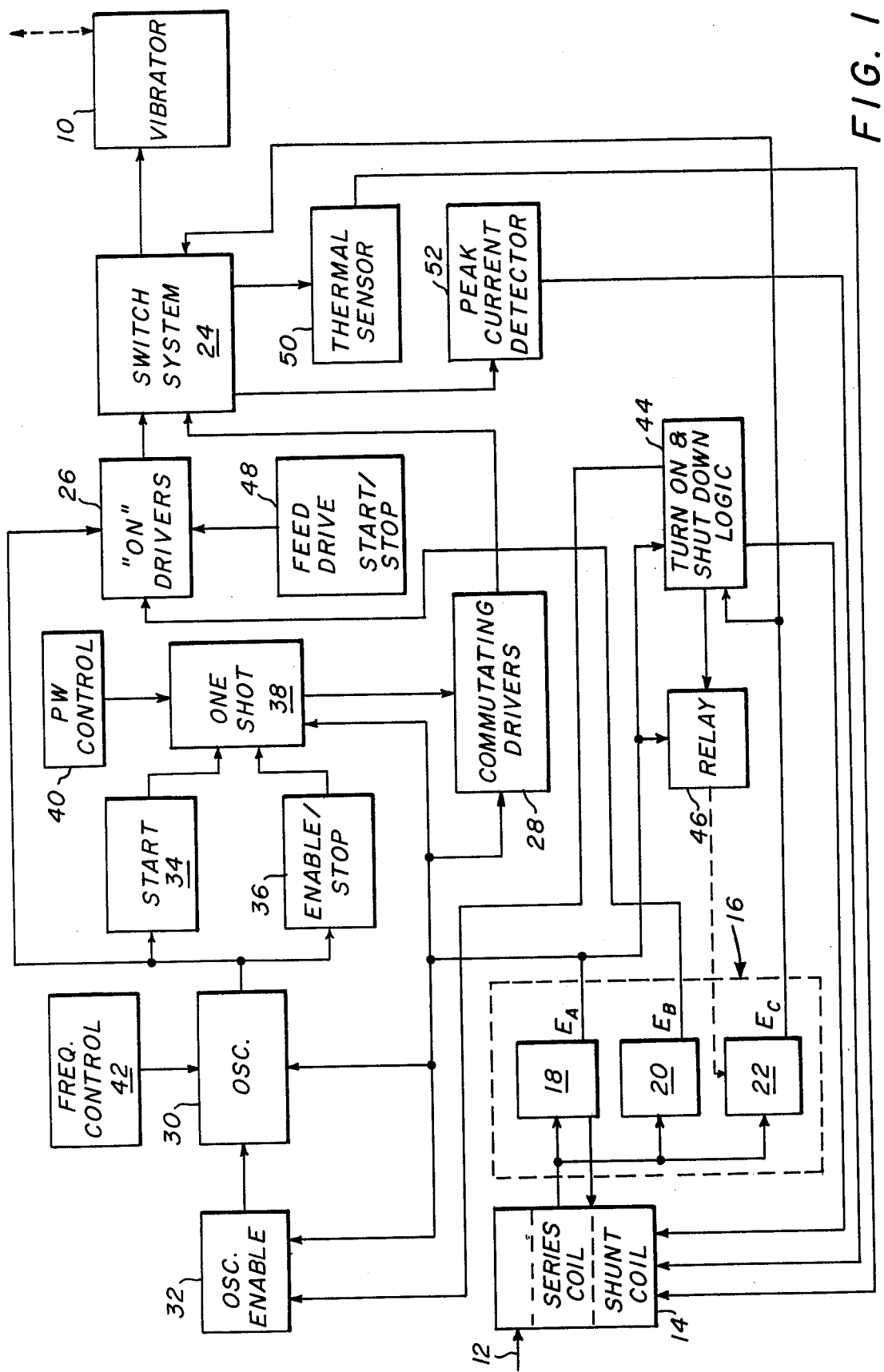
FIG. 1 is a functional block diagram of a switch control system in accordance with a preferred embodiment of the invention.

With reference to the drawing, the present invention will be described in the environment of a control system for a vibratory feed mechanism which employs an electromagnetic type actuator. In FIG. 1, which is a functional block diagram of the preferred embodiment of the invention, the electromagnetic actuator is indicated at 10. Under normal operating conditions, with the output member of vibrator 10 coupled to a feed mechanism, the coil of the actuator will constitute an inductive load on the control system and the vibrator will be operating at its resonant frequency with the output member thereof reciprocating over a path length commensurate with a selected vibrator output amplitude.

Power for driving actuator 10 is derived from an alternating current source, for example the conventionally available 50 or 60 cycle supply which has been indicated at 12. The alternating current is delivered, via the series coil of a circuit breaker 14, to a DC power supply, which has been indicated generally at 16. In accordance with a preferred embodiment, power supply 16 will consist of three separate rectifiers with associated filters as indicated at 18, 20 and 22. Power supplies 18 and 20 respectively furnish the requisite DC potentials $E_A$ and $E_B$ for timing circuitry which controls the operation of the system of the invention and for the means which provides, in response to a timing signal, the gating pulses for "closing" switches through which current is delivered to the coil of actuator 10. The third or "off line" power supply 22 furnishes energy which, via a drive or switching system 24, is periodically exchanged with the coil of vibrator 10.

In accordance with the present invention the switching system 24 comprises a switching circuit employing silicon controlled rectifiers (SCR's) and diodes. The switching of the SCR's of system 24 between their conductive and non-conductive states is directly controlled by a drive and commutation control which has been indicated in FIG. 1 as two separate circuits 26 and 28; drive control circuit 26 comprising the means for generating gating pulses for turning on the main SCR's of switching system 24 through which current is delivered to the actuator coil and commutation control circuit 28 comprising the means for commutating these main coil current supplying SCR's to turn these rectifier devices off. Circuits 26 and 28 are shown schematically in FIG. 3. A DC potential $E_B$ for operating drive control circuit 26 is furnished by power supply 20 while the output $E_A$ of power supply 18 is applied to commutation control circuit 28.

The timing signals for drive control circuit 26 and the timing signals for commutation control circuit 28 are derived from the output of an oscillator 30. Oscillator 30, when enabled by a signal provided by an enabling gate 32, provides a square wave output signal which is delivered directly to drive control circuit 26. The square wave output signal from oscillator 30 is also delivered to a "start" control circuit 34 and an "enable/stop" control circuit 36 which cooperate to control the period of the output signal provided by a monostable pulse generator 38. The output of the "one shot" pulse generator 38 functions as the timing control input for the commutation control circuit 28. For the purposes which will be described below, a separate manually adjustable pulse width control 40 is provided for pulse generator 38. Also, a manually adjustable frequency control 42 is coupled to oscillator 30. All of circuits 30, 32, 34, 36, 38, 40 and 42 are also shown schematically on FIG. 3 and receive power from power supply 18.

The embodiment of FIG. 1 is also provided with a "turn on and shut down" logic control circuit 44 which, through the oscillator enable control 32, controls the starting of oscillator 30. Logic control circuit 44 senses the magnitude of the output $E_C$ of power supply 22 and, via a relay 46, may isolate the output of the rectifier in "off line" power supply 22 from the power supply filter capacitor and from switching system 24. Logic control circuit 44 also provides a signal to the shunt coil of circuit breaker 14 to cause tripping of the breaker under the conditions to be described below.

A preferred embodiment of the present invention may also include a feed drive start/stop circuit 48 which has the capability, in response to the operating conditions of the equipment being driven by the vibrator 10, of disabling drive control circuit 26 whereby the main SCR's of switching system 24 will remain in the extinguished condition. Also, a thermal sensor 50 and a peak current detector 52 are coupled to a switching system 24 for the purpose of generating control signals which will, when delivered to the shunt coil of circuit breaker 14, cause the interruption of power to the entire control and drive system. Thus, should the peak current being delivered to vibrator 10 exceed a predetermined level, as might occur if the invention is employed to drive a feeder coil having a larger current rating than that of switching system 24, the system will be shut down. Similarly, if the temperature of the main current supply SCR's should exceed a predetermined level for any reason, for example selection of an unacceptably high duty cycle, shutdown will occur.

Before discussing specific examples of novel circuitry which may be employed for several of the subsystems indicated in block form in FIG. 1, operation of the preferred embodiment of the invention will be briefly described. Assuming the system is operating normally, vibrator 10 will be operating at its resonant frequency. At this time the circuit breaker 14 will be in the closed condition and the "off line" power supply 22 will be providing current at the proper DC voltage level to switching system 24. Through the action of the main SCR's in switching system 24; i.e., the SCR's which are directly coupled to the coil of vibrator 10; an alternate exchange of energy between the filter capacitance in power supply 22 and the vibrator coil will be occurring. The frequency of the energy exchange will be controlled by oscillator 30; oscillator 30 providing a square wave output signal at a frequency determined by the setting of its frequency control circuit 42. The oscillator output signal will, under proper conditions, be at the mechanical resonant frequency of the load comprising vibrator 10 and the feed device to which the vibrator is mechanically coupled.

As noted, the output of oscillator 30, via drive control circuit 26, controls the turning on of the main coil supply SCR's of switching system 24. The output of oscillator 30 is, in addition to being delivered to drive control circuit 26, also delivered to the "enable/stop" circuit 30 and the "start" circuit 34 which control pulse generator 38. The "start" circuit 34 is responsive to the leading edge of each output pulse from oscillator 30 and, commensurate therewith, generates a signal which causes pulse generator 38 to change its output state. The period of the signal provided by pulse generator 38 is adjustable by means of control 40. The output of pulse generator 38, via commutation control circuit 28, controls commutating SCR's in switching system 24. Thus, pulse generator 38 determines the duty cycle of switching system 24 to thereby control the amplitude of the output of vibrator 10. If the setting of control 40 should require that pulse generator 38 have an output duty cycle which is greater than 50% at the resonant frequency of the system, the switching of circuit 38 back to its initial state will be controlled by the "enable/stop" circuit 36 which is responsive to the trailing edge of each output pulse of oscillator 30; i.e., the "enable/stop" circuit 36 will "stop" pulse generator 38 at one-half duty cycle. In the manner known in the art, the commutation control circuit 28 provides gate drive pulses to commutating SCR's of switching system 24 to "hard" commutate the main coil current supply SCR's and thus interrupt the delivery of current, which was initiated by the drive pulses from drive control circuit 24, to vibrator 10 from power supply 22.

When provided, the feed drive start/stop control circuit 48 provides information to drive control circuit 26 which effects the starting of the energy exchange between power supply 22 and vibrator 10.

Circuit breaker 14, which is a commercially available device including both series and shunt coils, functions as the main on/off switch for the system. Circuit breaker 14 also functions as a series current protection device. Thus, the circuit breaker will open if there is a short circuit in any of the three power supplies 18, 20 and 22, if SCR latch-up occurs in switching system 24 or if commutation failure occurs in switching system 24. The shunt coil of circuit breaker 14 will be responsive to the output of the thermal sensor 50 and/or the peak current detector 52. The shunt coil of ciruit breaker 14 is also responsive to commands generated, in the manner to be described below, by the logic control system 44.

As noted above, separate power supplies 20 and 18 are respectively employed to provide the DC voltage for operation of the main SCR drivers in drive control circuit 26 and for providing power for the remainder of the control circuitry. This isolation in necessary to keep the drive control devices in circuit 26 isolated from the commutation drives in circuit 28 during commutation of the SCR's in switching system 24.

In drive systems for electromagnetic vibratory feeders it is necessary that the SCR's or other switching devices in the drive system, such as switching system 24 of FIG. 1, be in the off condition when power is applied to thus allow the circuits, and particularly the power supplies, to stabilize. In the present invention the logic control system 44 provides a time delay between the closing of circuit breaker 14 and the delivery of signals from oscillator 30 to drive control circuit 26. This time delay will be adequate to permit the output of power supply 22 to stabilizer at the proper DC voltage level $E_C$. Upon application of power to the system logic circuit 44 will immediately develop a signal which is applied to the oscillator enable circuit 32. Enable circuit 32 will be activated and will prevent oscillator 28 from beginning to provide a square wave output signal. Simultaneously, logic system 44 will provide a control signal to relay 46. Relay 46 is not necessary for proper operation of the system but, when employed, may have a pair of contacts which are maintained in the open condition by the output from logic system 44 with an under-voltage condition; these relay contacts being in series with the output of power supply 22 whereby power supply 20 will be isolated from switching system 24. Relay 46 may also, or alternatively, have a pair of initially open contacts in parallel with a charging resistor for the filter capacitor in power supply 22. After a time delay which is normally sufficient for the output voltages of power supplies 18, 20 and 22 to stabilize, and provided that the output voltage of power supply 22 as sensed by logic control system 42 is at the proper level, the disable command signal will be removed from the input to oscillator enable circuit 32 and the contacts of relay 46 will change state. However, if the output voltage from power supply 22 is less than the desired value at the end of the delay period, the logic control system 44 will generate a signal which, when passed through the shunt coil of circuit breaker 14, will cause tripping of the circuit breaker.

Figure 2:
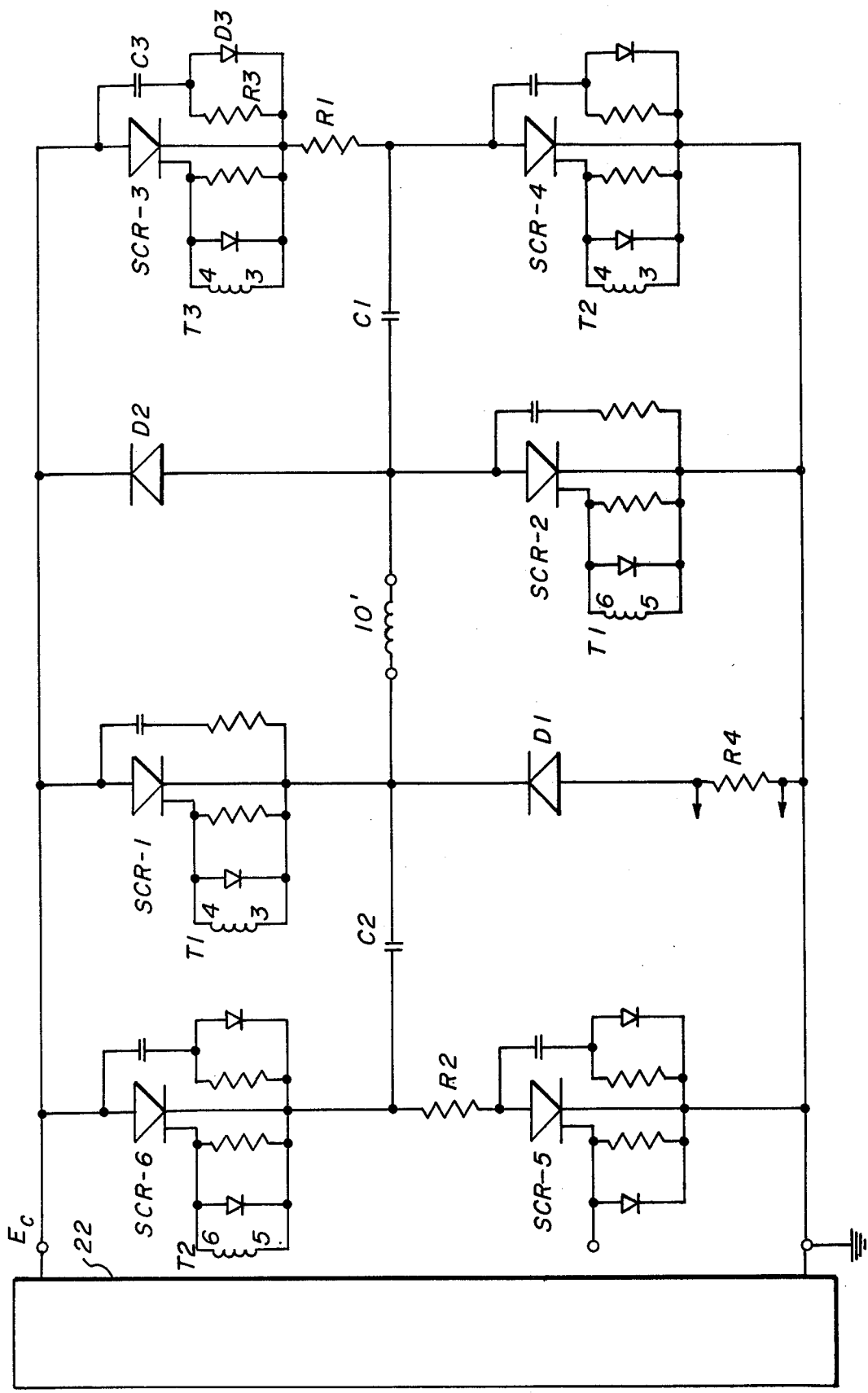
FIG. 2 is a schematic drawing showing the main solid-state switches of the system of FIG. 1 and the means for causing commutation of these switches.

Referring now to FIG. 2, the components comprising switching system 24 are shown schematically. The circuitry of FIG. 2 is connected across the "off line" power supply 22 which will typically comprise a bridge type rectifier, connected across the AC line, and an RC filter circuit connected between the rectifier bridge and the output terminals of the power supply. The switching system 24 consists of an SCR/diode circuit including main controllable rectifier devices SCR-1 and SCR-2 which are respectively connected in series with diodes D1 and D2. As previously noted, the present invention is a power resonant system. In operation SCR-1 and SCR-2 are simultaneously gated, in the manner to be described below, into the conductive condition by pulses coupled through transformer T1. After a conduction period determined by the output of either oscillator 30 or pulse generator 38, depending on whether the system has adjustable duty cycle capability, SCR-1 and SCR-2 are commutated and the energy stored within the coil 10' of actuator 10 is returned to the filter capacitor in power supply 22 via diodes D1 and D2.

Commutation of SCR-1 and SCR-2 is achieved by means of commutation circuits employing further SCR's. The commutation circuit for SCR-1 includes SCR-3 and SCR-4 which, in the manner to be described below, cooperate with a resistor R1 and a commutating capacitor C1. Similarly, commutation of SCR-2 is accomplished through the use of SCR-5, SCR-6, resistor R2 and commutating capacitor C2. Assuming that main SCR's 1 and 2 are turned on, SCR's 3 and 5 will also initially be conducting. Commutating capacitor C1 will thus be charged through resistor R1 and SCR's 2 and 3. When the charge on capacitor C1 reaches approximately $E_C$ at the side of capacitor C1 which is connected to resistor R1, SCR-3 will self-commutate due to the fact that the current through SCR-3 will fall below the holding current level for this device; this mode of turning off SCR-3 being known in the art as "soft" commutation. When it is desired to commutate SCR-2, SCR-4 will be turned on by a pulse from control circuit 28 as coupled to the SCR via transformer T2. Conduction of SCR-4 will result in capacitor C1 being connected across SCR-2 with the positive potential being applied to the cathode of SCR-2. SCR-2 is thus shut off in a manner known in the art as "hard" commutation. If a diode is provided across SCR-2 then the commutation of SCR-2 will be "soft" commutation. In the same manner, SCR-5 will self-commutate when the charge across capacitor C2 reaches approximately $E_C$ and SCR-1 may thereafter be "hard" commutated by the turning on of SCR-6. SCR's 4 and 6 are self-commutated after SCR's 1 and 2 have been turned off.

A novel feature of the present invention consists of the inclusion, in the commutation control circuitry, of the resistors R1 and R2. It is to be noted that these resistors must be connected between the cathode of the self-commutating SCR and the junction between the commutating capacitor and the anode of the control SCR. The resistors R1 and R2 perform four separate and distinct functions. Firstly, these resistors serve as the charging resistors for the commutating capacitors with the charging time of the commutating capacitors being approximately equal to RC. Thus, the resistors R1 and R2 determine the on time of SCR's 3 and 5. The resistors R1 and R2 also determine the peak current through these self-commutating SCR's. The higher the value of resistors R1 and R2, the lower the peak current through the series connected SCR's, the longer the charge time for the commutating capacitors and the longer SCR's 3 and 5 are in the conductive state. In respectively providing a current path for charging capacitors C1 and C2, resistors R1 and R2 also provide a portion of the holding current for the main SCR's 1 and 2 until the current through coil 10' of the electromagnetic vibrator reaches a level sufficient to provide the minimum required holding current for SCR's 1 and 2. The commutating SCR's 4 and 6 can not be turned on until the time greater than 2 RC; i.e., until twice the time constant of the circuits comprising R1 and C1 and R2 and C2 has elapsed. The resistors R1 and R2 thus limit the minimum amplitude of the excursions of the electromagnetic vibrator.

Continuing with a discussion of the function of resistors R1 and R2, and limiting the discussion to resistor R1 in the interest of facilitating understanding of the invention, when commutating SCR-4 is gated on, SCR-3 must be in the non-conductive state. Were this not the case, resistor R1 would comprise the load on the system and circuit breaker 14 would be tripped as a result of an over current condition. When SCR-4 is activated there will be a high rate of change of voltage between the anode and cathode of SCR-3. The stress on SCR-3 resulting from this high dv/dt is relieved to a satisfactory level as a result of the RC series circuit defined by capacitor C3 connected to the anode of the SCR and resistor R1; the further resistor R3 which is in series with the capacitor C3 being short circuited by a diode D3 in parallel with the resistance at this time. Thus, the rate of change of voltage across SCR-3 will be limited by the time constant of the circuit including resistor R1 when SCR-4 is gated on. A similar diode is, of course, provided in parallel with the resistor in the RC circuit between the anode and cathode of SCR-5. Diodes may also be employed, but are not required, in parallel with the similar resistors in the "snubber" circuits around SCR's 4 and 6. Resistors R1 and R2 also inhibit the application of spurious pulses at the gates of their respective SCR's 3 and 5 during the commutation of SCR-1 and SCR-2.

Figure 3:
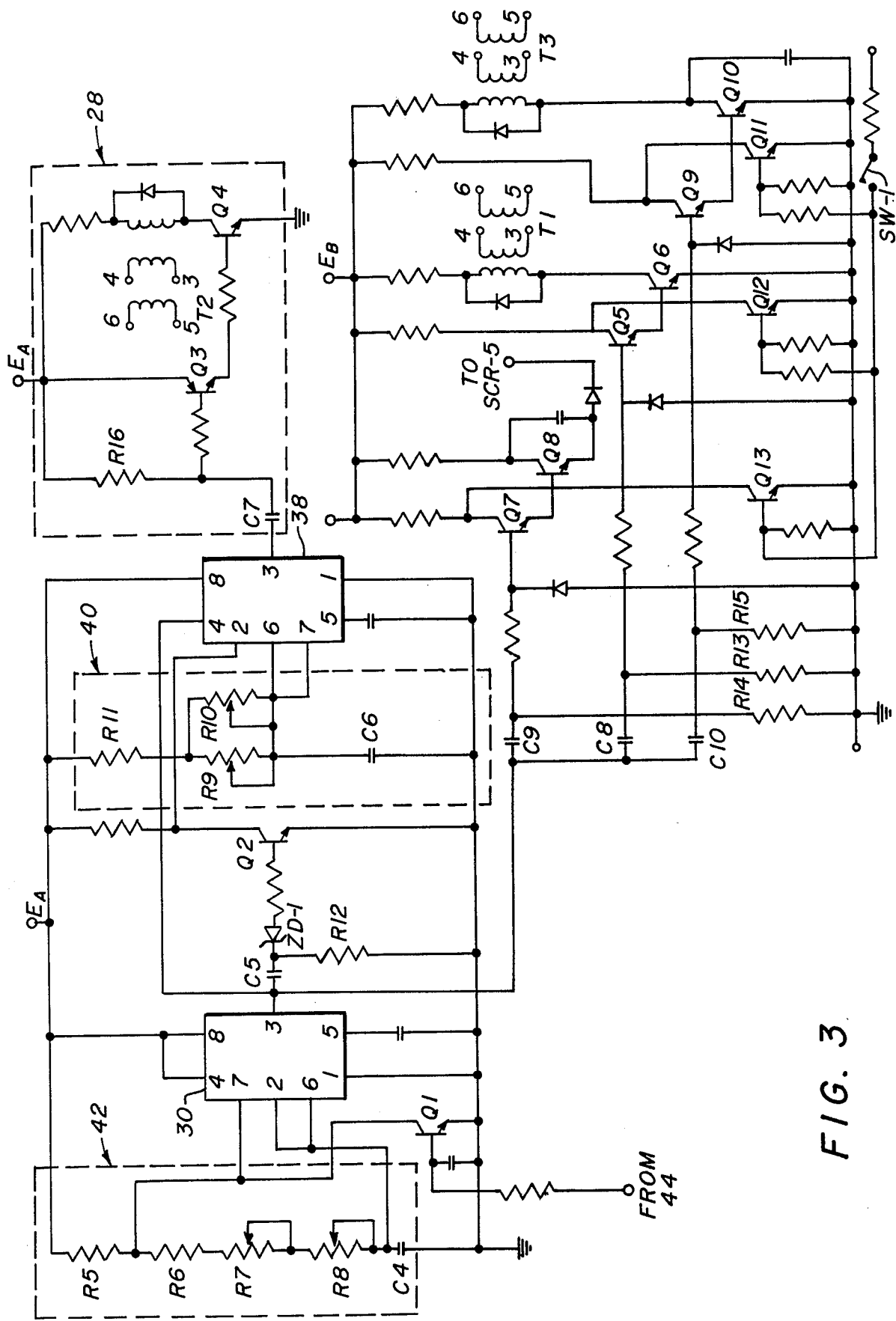
FIG. 3 is a schematic diagram depicting the timing and control circuitry for the main and commutating solid-state switches of FIG. 2 in accordance with the embodiment of FIG. 1.

The gating or turn on pulses for the main switching system SCR's 1 and 2 are, as noted above, coupled to these solid-state switches via secondary windings of a pulse transformer T1. The primary winding of transformer T1 is in drive control circuit 26 as shown in FIG. 3. The gating pulse for self-commutating SCR-3 is derived from the secondary winding of a transformer T3. The gate of self-commutating SCR-5 is directly driven. The commutating SCR's 4 and 6 have secondary windings of a pulse transformer T2 coupled between their gates and cathodes. The diodes which are connected in parallel with the pulse transformer secondary windings, and between the gate and cathode of SCR-5, prevent reverse gate voltage while the resistors, which are connected in parallel with these diodes, damp unwanted signals. As discussed above with regard to SCR-3, a "snubber" circuit comprising a capacitor and resistor connected in series may be connected between the anode and cathode of each of the six SCR's.

The overall efficiency of a power resonant vibratory feeder control system, such as that being described, is dependent upon the type of load at the feeder. Restated, the weight of the material being moved along a feeder operated by actuator 10 effects the efficiency of operation of the system with heavier loads requiring greater current. In order to prevent overcurrent, means must be provided to limit the current through the main switching system SCR's and diodes. In a preferred form, because of its inherent simplicity, this current limiter may comprise a resistor R4 connected between the anode of diode D1 and ground. After commutation of SCR's 1 and 2, the peak current passing through the coil 10' will begin to flow through diodes D1 and D2 and resistor R4. The current flow through resistor R4 develops a voltage across this resistor and this voltage has a polarity such that the ground connection is positive with respect to the connection to the anode of diode D1. This "negative" pulse, in the manner to be described below, may be employed to trip circuit breaker 14 should there be excessive current flow through diodes D1 and D2.

Referring now to FIG. 3, the actual circuitry comprising oscillator 30 and its enabling control circuits 32 and 42, the "one shot" pulse generator 38 and its control circuits 34, 36 and 40, the drive control circuit 26, the commutation control circuit 28 and the feed drive start/stop circuit 48 are all shown schematically. Oscillator 30, in the preferred embodiment, comprises an integrated circuit such as a Signetics Corporation type 555 timer connected as a free running square wave generator. The integrated circuit comprising oscillator 30 is indicated in FIG. 3 at 30. The monostable pulse generator 38 also comprises a type 555 timer connected as a monostable multivibrator. The timer circuit comprising pulse generator 38 is indicated on FIG. 3 at 38. Control of the frequency of oscillator 30; i.e., the control circuit 42, is defined by resistors R5 and R6, potentiometers R7 and R8 and capacitor C4. The maximum frequency of oscillation is determined by resistors R5 and R6 and capacitor C4. The minimum frequency of oscillation is determined by the total values of resistors R5 and R6, the settings of potentiometers R7 and R8 the the value of capacitor C4; potentiometer R7 being the course frequency control and potentiometer R8 being the fine frequency control. The oscillator enable circuit 32 is comprised of normally non-conductive transistor Q1. When Q1 is turned on by an output from logic control system 44, the frequency control input to oscillator 30 will be grounded and the oscillator will be disabled.

The output at pin 3 of the integrated circuit comprising oscillator 30 is a square wave having an amplitude which is approximately equal to the output voltage $E_A$ of power supply 18 on the first half cycle and approximately zero voltage on the second half cycle. This square wave output signal is coupled, in the manner to be described below, to the drive control circuit 26 which causes the main switching SCR's 1 and 2 to be turned on. The square wave output of oscillator 30 30 is also coupled, via a differentiator including capacitor C5 and a Zener diode ZD-1, to the base of a normally non-conductive transistor Q2. Diode ZD-1 insures that the output of power supply 18 will be at the desired level before drive begins by preventing one-shot 38 from being turned on if there is an under-voltage. Restated, generator 38 can not be turned on unless $E_A$ exceeds the Zener voltage and the base-emitter voltage drop of $Q_2$. Diode ZD-1 thus also functions to shut down the system under brown-out conditions.

Transistor Q2 defines the "start" circuit 34 for the pulse generator 38. Control over pulse generator 38; i.e., the control circuit 40 of FIG. 1, is accomplished via resistor R11, potentiometers R9 and R10 and a capacitor C6. Potentiometer R9 functions as a feed limit control which will be factory adjusted to prevent an operator from selecting a feed rate higher than a specified level. The feed limit control R9 may also be set to provide a full range of control, through manipulation of potentiometer R10, on a feeder having a smaller power requirement than that for which the feeder control of the present invention has been designed. The coupling of the output of oscillator 30 directly to pin 4 of pulse generator 38 insures that the maximum duty cycle of pulse generator 38 will be not greater than 50%; i.e., the direct connection between the output of oscillator 30 and pin 4 of pulse generator 38 comprises the enable/stop circuit 36. Thus, the pulse generator 38 will be enabled only during the first half cycle of the output of oscillator 30 when the oscillator output is approximately at the level of the DC voltage $E_A$ supplied by power supply 18. The minimum width of the output pulses provided by one-shot 38 is determined by R11 and C6 or the time constant of the differentiator circuit comprising coupling capacitor C5 and resistor R12, whichever is greater. Thus, when the output of oscillator 30 goes high at the start of each cycle, the leading edge of the pulse is differentiated and applied to transistor Q2 thereby turning on Q2 for a period of time determined by the time constant of C5 and R12. The output of pulse generator 38 is delivered, via coupling capacitor C7, to the commutation control circuit 28 which is comprised of transistors Q3 and Q4 and the primary winding of transformer T2.

The leading edge of the output pulses provided by oscillator 30 are differentiated, in a circuit comprising capacitor C8 and resistor R13, and the resulting short duration pulses are applied to the base of the input transistor Q5 of a Darlington amplifier comprised of transistors Q5 and Q6. Pulsing the base of transistor Q5, in the manner known in the art, results in transistor Q6 being driven into saturation. The primary winding of transformer T1 is in the collector circuit of transistor Q5 and acts as the load thereon. Thus, the application of a positive pulse to the base of transistor Q5 commensurate with the leading edge of each output pulse provided by oscillator 30 will result in a pulse being coupled through transformer T1 to gate on SCR's 1 and 2 (FIG. 2). In a similar manner, transistors Q7 and Q8 form a Darlington amplifier which, in response to positive pulses provided by a differentiator comprising capacitor C9 and resistor R14, provide a pulse at the emitter of transistor Q8 which is diode coupled to the gate of SCR-5. A differentiation circuit comprised of capacitor C10 and resistor R15 provides a pulse, also commensurate with the leading edge of each oscillator output pulse, to the base of transistor Q9 of a further Darlington amplifier consisting of transistors Q9 and Q10. In the manner described with respect to the Darlington circuit consisting of transistors Q5 and Q6, the positive pulse at the base of transistor Q9 will cause transistor Q10 to be driven into saturation and a pulse will thus be coupled, via transformer T3 which has its primary winding in the collector circuit of transistor Q10, to the gate of SCR-3 to turn on this silicon controlled rectifier. Thus, in summary, under normal operating conditions the leading edge of each output pulse provided by oscillator 30 will be differentiated to produce a control pulse which causes a gating pulse to be directly delivered to the gate of SCR-5 and to be transformer coupled to the gates of SCR's 1, 2 and 3. Accordingly, at the beginning of each cycle of the square ware provided by oscillator 30, the main SCR's 1 and 2 and the self-commutating SCR's 3 and 5 will be turned on, current will be delivered from power supply 22 to the coil 10' of the actuator and commutating capacitors C1 and C2 will begin to charge. The capacitors in parallel with transistors Q8 and Q10 are required to prevent unwanted pulses at the gates of SCR-5 and SCR-3 respectively which may occur during commutation of SCR's 1 and 2.

As noted above, the output pulse from one-shot 38 is coupled to the commutation drive control 28. Coupling capacitor C7 cooperates with resistor R16 to define a differentiator responsive to the trailing edges of the output pulses from pulse generator 38. Transistors Q3 and Q4 form a pnp-npn Darlington amplifier responsive to negative pulses provided by differentiator R16-C7. When transistor Q3 is turned on by these negative pulses, transistor Q4 will be driven into saturation whereby a pulse will be coupled, via transformer T2 which has its primary winding in the collector circuit of Q4, to commutation control SCR's 4 and 6 thereby turning on the gates of the commutating SCR's.

It is worthy of note that the output pulse generator 38 will be employed only when an adjustable duty cycle is desired. If the duty cycle of the drive system for the actuator of a vibratory feeder is to be 50%, pulse generator 38 will be disconnected and its output terminal will be connected to the output of oscillator 30.

It is also to be observed that the timing circuit including oscillator 30 and one-shot 38 and the commutation drive circuit 28 are connected to power supply 18 while the drive control circuit 26, which includes the three Darlington amplifiers responsive to the output pulses of oscillator 30, is connected to power supply 20. As noted above, it is desirable to completely separate commutation from turn on and this isolation may be achieved through the use of separate power supply circuits.

The feed drive start/stop circuit 48, in accordance with the disclosed embodiment of the invention, comprises normally open switch SW-1 and transistors Q11, Q12 and Q13. With switch SW-1 in the open condition the system will be operating normally with gating pulses being delivered to the main and self-commutating SCR's of switching system 24 via transformers T1 and T3 and through direct coupling from the emitter of transistor Q8. Switch SW-1 may, for example, be part of an optical sensor system which detects a pile up of material being fed along or to a vibrating feeder which includes the actuator coil 10' of FIG. 2. Should a feed pile up occur, switch SW-1 would automatically be closed thereby supplying base drive to transistors Q11, Q12 and Q13 thus rendering these transistors conductive. Conductive of transistors Q11, Q12 and Q13 will, respectively, result in the collectors of Darlington amplifier input transistors Q9, Q5 and Q7 being pulled to approximately ground. Accordingly, with switch SW-1 closed and transistors Q11, Q12 and Q13 conducting, gating pulses to turn on the SCR's will not be provided and feeder drive will thus automatically stop.

It is important, until the power supply output voltages stabilize at the proper levels, that the drive switches of a vibratory feeder control be inhibited from turning on. This is true regardless of whether these drive switches comprise silicon controlled rectifiers, as discussed with respect to FIG. 2, transistors or some other type of switching device. As generally discussed above, in accordance with a preferred embodiment of the present invention the main switches are initially held in the "off" condition by turn on and shut down logic control 44. Logic control 44 is shown schematically in FIG. 4 and includes inverting NOR gates G1, G2, G3, G4, G5, G6, G7 and G8. The logic control circuit 44 also includes a pair of Darlington amplifiers respectively comprising transistors Q14 and Q15 and transistors Q16 and Q17.

Figure 4:
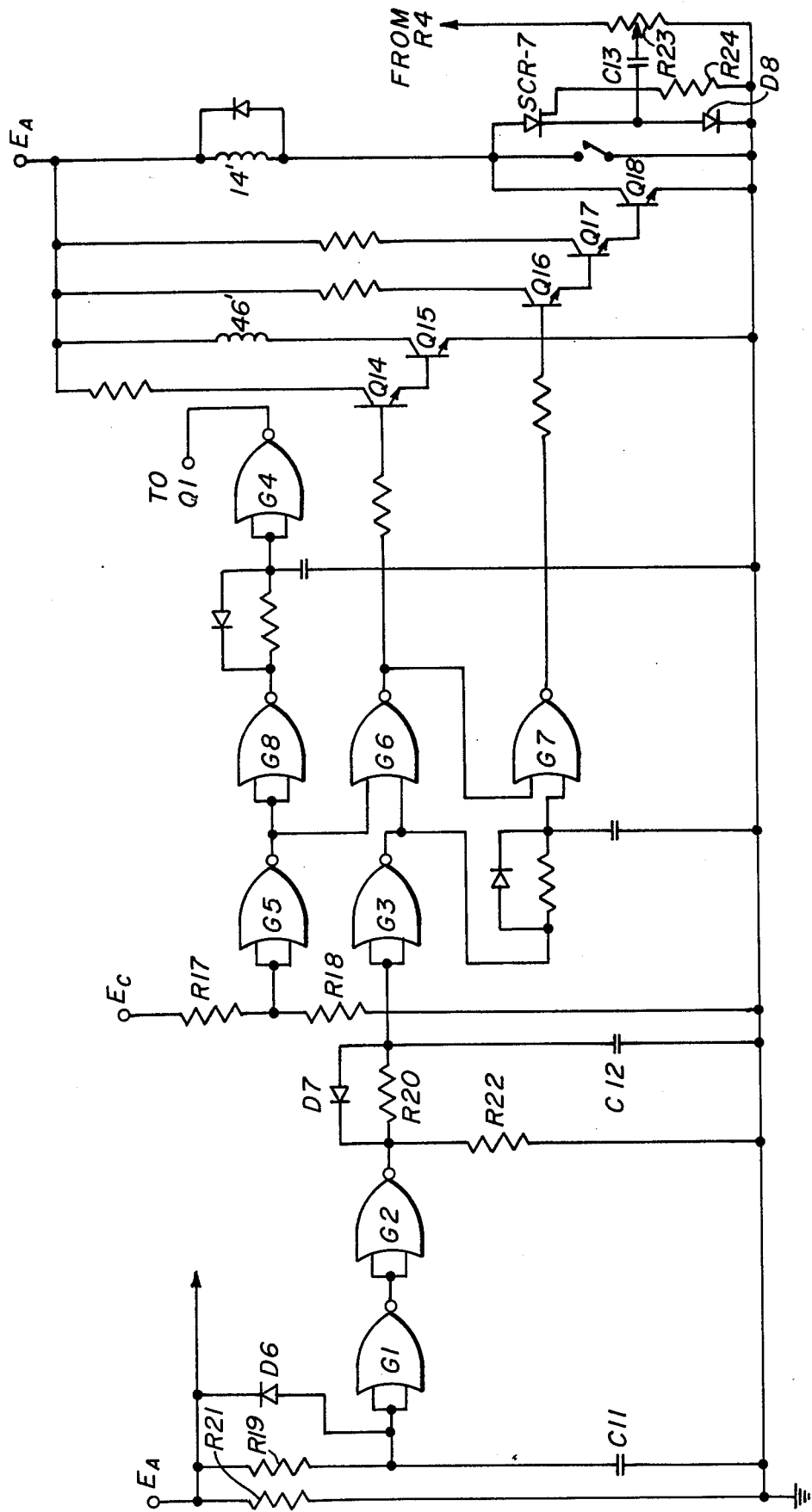
FIG. 4 is a schematic diagram of the logic control circuitry of the embodiment of FIG. 1.

In control 44, as shown in FIG. 4, the $E_A$ output voltage of power supply 18 is delivered as the input to NOR gate G1. The $E_C$ output voltage from the off line power supply 22 is delivered as the input to NOR gate G5. When the main circuit breaker 14 is closed, $E_C$ will initially be zero and will rise as the filter capacitor in power supply 22 is charged through a charging resistor. Thus, initially upon closing of circuit breaker 14, the input to gate G5 will be zero and thus gate G5 will provide a "one" at its output. The voltage appearing at the inputs to gate G5 is determined by a voltage divider consisting of resistors R17 and R18. When the voltage appearing at the inputs to gate G5 rises to a level commensurate with the desired value of $E_C$ gate G5 will switch thus providing a "zero" at its output. Similarly, upon application of power to the system, output voltage $E_A$ will be zero and thus NOR gate G1 will provide a "one" at its output terminal; this "one" being delivered as the input to gate G2. As voltage level $E_A$ rises, capacitor C11 will be charged and at the appropriate $E_A$ voltage level gate G1 will switch whereby a "zero" will appear at the input to gate G2.

To summarize the initial conditions, "zeros" will be applied at both inputs to NOR gates G1 and G5 whereby the outputs of each of these gates will be a logic "one". The "one" output of gate G1 is applied as the input to gate G2 whereby gate G2 provides a "zero" at the input to gate G3. Gate G3, in turn, provides a logic "one" output as a first input to gate G6. The second input to gate G6 is the "one" output of gate G5. NOR gate G6 thus provides a "zero" output. The "one" output of gate G5 is also applied to both inputs of G8 whereby gate G8 provides a "zero" input to gate G4. Gate G4, in turn, provides a "one" output which is delivered, as the disabling signal, to the base of transistor Q1 of the oscillator enable circuit 32. Thus, upon initial application of power to the system, oscillator 30 will be disabled in response to the control signal provided at the output of gate G4 of logic control circuit 44; this control signal being applied to the oscillator enable circuit 32. Similarly, the "zero" output of NOR gate G6 is applied to the base of input transistor Q14 of the Darlington amplifier comprising transistors Q14 and Q15. Transistor Q15 will, accordingly, be in the "off" condition at this time. The coil of relay 46, indicated at 46' in FIG. 4, is in series with the collector of transistor Q15 and thus relay 46 will not be activated and the relay contacts through which power supply 22 may be connected to switching system 24 will be in the open condition.

As the output voltage of power supply 18 increases, the charge on capacitor C11 will rise. Similarly, the output voltage $E_C$ of power supply 22 will increase. After a time delay determined by the time constant of the circuit comprising input resistor R19 and capacitor C11, the voltage across capacitor C11 will reach a level sufficient to provide a logic "one" at the input of NOR gate inverter G1. Gate G1 will thus deliver a "zero" input to gate G2 which will provide a "one" output. The logic "one" output of gate G2 will be delayed from application to the input to NOR gate G3 for a period determined by the time constant of the circuit comprising resistor R20 and capacitor C12. Thus, upon switching of gate G2, capacitor C12 will begin to charge through resistor R20. The time delay afforded by the input circuits to gates G1 and G3 is selected so as to be sufficient to allow the filter capacitor in power supply 22 to normally charge adequately before relay 46 is activated and its contacts closed. After the time delay determined by R20 and C12, the voltage across capacitor C12 will appear as a logic "one" to the input to NOR gate inverter G3. Gate G3 will thus provide a zero at its output. If voltage $E_C$ has risen to the appropriate level at this time, gate G5 will have been switched and thus NOR gates G3 and G5 will both be providing "zeros" at the inputs to gate G6. The inverter gate G6 will thus provide a logic "one" at the base of input transistor Q14 of the relay coil Darlington drive amplifier, relay 46 will accordingly be energized and its contacts closed thus coupling the output of the off line power supply 22 to the switching system 24 and/or short circuiting the charging resistor in power supply 22. Simultaneously, the "zero" output of gate G5, indicative that the output of power supply 22 has reached the appropriate level, will be delivered to gate G8 which, in turn, will provide a logic "one" at the input to gate G4. This results in the logic "one" which previously appeared at the output of gate G4 being removed whereby the disabling signal is removed from the base of transistor Q1 of enable circuit 32 and oscillator 30 will be enabled.

Should the output voltage $E_C$ of power supply 22 fail to rise to the level required to provide a logic "one" at the input to gate G5, the disabling signal will not be removed from oscillator 30, relay 46 will remain deenergized and gate G6 will provide a "zero" output. The outputs of gates G3 and G6 are applied as inputs to gate G7. Thus, when $E_C$ is low gate G7 will have "zeros" at both input terminals whereby this gate will provide a logic "one" at its output terminal. The output of gate G7 is applied as the control signal to the Darlington amplifier comprising transistors Q16 and Q17. When a logic one appears at the output of gate G7, transistor Q17 will be rendered conductive whereby transistor Q18 is turned on. The shunt coil of circuit breaker 14 is in series with the collector of transistor Q18 and thus, whenever zeros appear at both inputs to gate G7, current will flow through the shunt coil of circuit breaker 14 thereby tripping the breaker and shutting down the entire circuit.

A diode D6 and resistor R21 are provided, in the input circuit to gate G1, to provide a discharge path for capacitor C11 when circuit breaker 14 is turned to the off position. Similarly, diode D7 and resistor R22 are provided to function as a discharge path for capacitor C12 when the output of gate G2 goes to zero upon the turning off of the entire system. Thus, upon turn off of circuit breaker 14, both of capacitors C11 and C12 will rapidly discharge and the system is ready to resume operation in the above-described manner immediately upon the reclosing of breaker 14.

Referring jointly to FIGS. 2 and 4, the negative pulse appearing across resistor R4 of switching system 24 is applied across potentiometer R23. Thus, a pulse having an adjustable magnitude will appear at the wiper arm of potentiometer R3; this pulse being negative with respect to ground. Through the action of coupling capacitor C13, and as a result of the inclusion of diode D8 and resistor R24 in the circuit, a positive pulse will be applied between the gate and cathode of a further silicon controlled rectifier SCR-7. When the amplitude of this pulse exceeds the gate trigger potential of SCR-7, the rectifier will be placed in the "on" condition. In the "on" condition SCR-7 places the power supply 18 across the shunt coil of circuit breaker 14 thus causing tripping of the breaker. The action of this circuit including SCR-7 is thus to protect the main SCR's of switching system 24 from damage should the physical load in a vibratory feeder driven by the invention increase to a point where excessive current would be required to maintain the output of the vibrator at the same amplitude as previously selected by the operator.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for periodically connecting a source of direct current to an inductive load,
    said direct current source including a capacitance connected between the opposite polarity output terminals thereof,
    said apparatus comprising:
    first solid-state switch means, said first switch means comprising a first silicon controlled rectifier connected between a first polarity terminal of the current source and a first side of the load;
    second solid-state switch means, said second switch means comprising a second silicon controlled rectifier connected between the second polarity terminal of the current source and the second side of the load, said first and second silicon controlled rectifiers and the load defining a series circuit through which current can flow in a first direction when said rectifiers are in the conductive state;
    a first diode connected between the first polarity terminal of the current source and the second side of the load; and
    a second diode connected between the second polarity terminal of the current source and the first side of the load, said first and second diodes and the load defining a series circuit through which current may flow in a second direction when said silicon controlled rectifiers are in the non-conductive state, said diodes, rectifier, load and power supply capacitance forming a resonant circuit whereby energy may be delivered to the load when the silicon controlled rectifiers are in the conductive state and returned from the load when the silicon controlled rectifiers are in the non-conductive state.
    oscillator means, said oscillator means generating timing control signals;
    drive control means, said drive control means being responsive to the timing control signals generated by said oscillator means for producing gating signals;
    means for coupling said drive control means produced gating signals to said first and second solid-state switch means to periodically render said first and second silicon controlled rectifiers conductive;
    commutation control means, said commutation control means being responsive to the timing control signals generated by said oscillator means for periodically producing turn-off signals, said turn-off signals alternating with said gating signals;
    means connected to said first and second solid-state switch means for interrupting current flow through said first and second silicon controlled rectifiers to thereby return said rectifiers to the non-conductive condition; and
    means for coupling said turn-off signals from said commutation control means to said current flow interrupting means.

2. The apparatus of claim 1 wherein said oscillator means comprises:
    a variable frequency square wave generator.

3. The apparatus of claim 1 wherein said means for interrupting current flow through said switch means solid-state switch devices each comprises:
    a commutating capacitor;
    third solid-state switch means, said commutating capacitor and said third solid-state switch means being connected in series, said series connection of commutating capacitor and third solid-state switch means being connected in parallel with the solid-state switch device which is in series with the load with the first plate of said commutating capacitor being connected to the anode of the silicon controlled rectifier of the load connected switch device;
    fourth solid-state switch means;
    a charging resistance for said commutating capacitor, said charging resistance and fourth solid-state switch means being connected in series with the free terminal of the charging resistance being connected to the series circuit of said commutating capacitor and third switch means at a point intermediate said capacitor and third switch means, the free terminal of said fourth switch means being connected to a first polarity terminal of the direct current source.

4. The apparatus of claim 3 wherein said means for coupling gating signals is connected to said first, second and fourth switch means to simultaneously place said first, second and fourth switch means in the conductive condition whereby current will flow from the direct current source through the load and the commutating capacitors will be charged.

5. The apparatus of claim 4 wherein said fourth solid-state switch means each include a switch device which is rendered conductive by said gating signals and which is returned to the non-conductive state in response to the charging of said commutating capacitor and wherein said charging resistance and commutating capacitors are selected such that said fourth solid-state switch means will be returned to the non-conductive state prior to the generation of said turn-off signals by said commutation control means.

6. The apparatus of claim 5 wherein said means for coupling turn-off signals to said current flow interrupting means comprises:
    means for delivering signals produced by said commutation control means to said third solid-state switch means to render said third solid-state switch means conductive, conduction of said third solid-state switch means placing the charge stored in said commutating capacitors across said first and second silicon controlled rectifiers.

7. The apparatus of claim 6 wherein each of said third and fourth solid-state switch means includes a silicon controlled rectifier.

8. The apparatus of claim 2 wherein said commutation control means comprises:
    means responsive to the signal produced by said square wave generator for producing a turn-off pulse at a predetermined interval subsequent to the beginning of each cycle of the square wave generator output signal.

9. The apparatus of claim 8 wherein said means for producing a turn-off pulse comprises:
    variable pulse generator means, said pulse generator means producing an output pulse having an adjustable width;
    means coupling the output of said square wave generator to said pulse generator means whereby said pulse generator means will generate an output pulse upon the receipt of a signal commensurate with the beginning of each cycle of the square wave generator output signal; and means for generating a turn-off signal in response to the trailing edge of each pulse provided by said pulse generator means.

10. The apparatus of claim 1 further comprising:
means for disabling said oscillator means;
means for sensing the magnitude of the output voltage of the direct current source and for generating a logic control signal when said voltage is below a preselected minimum level; and
means for delivering said logic control signal to said oscillator disabling means to cause disabling of said oscillator whereby said gating signals will not be generated.

11. Apparatus for periodically connecting a source of direct current to a load comprising:
switch means, said switch means including at least a first solid-state switch device connected in series with the load and current source;
oscillator means, said oscillator means generating timing control signals;
drive control means, said drive control means being responsive to the timing control signals generated by said oscillator means for producing gating signals;
means for coupling said drive control means produced gating signals to said switch means switch device to periodically render said device conductive;
commutation control means, said commutation control means being responsive to the timing control signals generated by said oscillator means for periodically producing turn-off signals, said turn-off signals alternating with said gating signals;
means connected to said switch means for interrupting current flow through said switch means solid-state switch device to thereby return said switch device to the non-conductive condition;
means for coupling said turn-off signals from said commutation control means to said current flow interrupting means whereby said interrupting means is responsive to said turn-off signals to disconnect the source from the load;
means for disabling said oscillator means;
means for sensing the magnitude of the output voltage of the direct current source and for generating a logic control signal when said voltage is below a preselected minimum level; and
means for delivering said logic control signal to said oscillator disabling means to cause disabling of said oscillator whereby said gating signals will not be generated.

12. The apparatus of claim 11 wherein said means generating a signal when the direct current supply output voltage is below a preselected minimum comprises:
first logic circuit means, said first logic circuit means including at least a first gate circuit having an output state indicative of whether the current supply output voltage is above or below the preselected minimum.

13. The apparatus of claim 12 wherein said direct current source provides at least a pair of output voltages, a first of said output voltages being connected to the load via said switch means and the second of said output voltages providing operating potential for the means which control the rendering of said switch means conductive and non-conductive, said apparatus further comprising:
circuit breaker means said circuit breaker means interrupting the output of the current source;
second logic circuit means, said second logic circuit means being connected to receive said second current source output voltage and assuming an output state indicative of whether said second voltage is above or below a preselected level;
means responsive to the output state of said first and second logic circuit means for generating a disabling signal; and
means for delivering said disabling signal to said circuit breaker means to cause disabling of said apparatus.

14. The apparatus of claim 11 wherein said oscillator means comprises:
a variable frequency square wave generator.

15. Apparatus for periodically connecting a source of direct current to the coil of an electromagnetic vibrator comprising:
a first silicon controlled rectifier connected between a first polarity terminal of the current source and the coil whereby current may be passed through the coil in a first direction when said first rectifier is in the conductive state;
a diode connected between the first polarity source terminal and the coil whereby current may flow through the coil in a second direction upon switching of said first rectifier to the non-conductive state.
oscillator means, said oscillator means generating timing control signals;
drive control means, said drive control means being responsive to the timing control signals generated by said oscillator means for producing gating signals;
means for coupling said drive control means produced gating signals to said first rectifier to periodically render said first rectifier conductive;
commutation control means, said commutation control means being responsive to the timing control signals generated by said oscillator means for periodically producing turn-off signals, said turn-off signals alternating with said gating signals;
means connected to said first rectifier means for interrupting current flow therethrough to thereby return said first rectifier to the non-conductive condition; and
means for coupling said turn-off signals from said commutation control means to said current flow interrupting means.

16. The apparatus of claim 15 wherein said means for interrupting current flow through said first rectifier comprises:
a commutating capacitor, a first plate of said commutating capacitor being connected to the anode of said first silicon controlled rectifier;
a second silicon controlled rectifier, said second silicon controlled rectifier being connected in series with said commutating capacitor, said series connection being connected in parallel with said first silicon controlled rectifier;
a charging resistance for said commutating capacitor; and
a third silicon controlled rectifier, said third rectifier being connected in series with said resistance, said series connection including said third rectifier having said resistance connected to the second plate of said commutating capacitor and a first terminal of said third rectifier connected to the second polarity terminal of the source.

17. The apparatus of claim 16 wherein said means for coupling gating signals is connected to said first, and third rectifiers to simultaneously place said first and third rectifiers in the conductive condition whereby current will flow from the direct current source through the load and said commutating capacitor will be charged.

18. The apparatus of claim 17 wherein said means for coupling turn-off signals to said current flow interrupting means comprises:
    means for delivering signals produced by said commutation control means to said second rectifier to render said second rectifier conductive, conduction of said second rectifier placing the charge stored in said commutating capacitors across said first rectifier.

19. The apparatus of claim 18 wherein said commutation control means comprises:
    means responsive to the signal produced by said oscillator for producing a turn-off pulse at a predetermined interval subsequent to the beginning of each cycle of the oscillator output signal.

20. The apparatus of claim 19 further comprising:
    means for disabling said oscillator means;
    means for sensing the magnitude of the output voltage of the direct current source and for generating a logic control signal when said voltage is below a preselected minimum level; and
    means for delivering said logic control signal to said oscillator disabling means to cause disabling of said oscillator whereby said gating signals will not be generated.

21. The apparatus of claim 20 wherein said means for producing a turn-off pulse comprises:
    variable pulse generator means, said pulse generator means producing an output pulse having an adjustable width;
    means coupling the output of said oscillator to said pulse generator means whereby said pulse generator means will generate an output pulse upon the receipt of a signal commensurate with the beginning of each cycle of the oscillator output signal; and
    means for generating a turn-off signal in response to the trailing edge of each pulse provided by said pulse generator means.

22. The apparatus of claim 15 wherein said oscillator means comprises:
    a variable frequency sqaure wave generator.

23. The apparatus of claim 22 further comprising:
    means for disabling said oscillator means;
    means for sensing the magnitude of the output voltage of the direct current source and for generating a logic control signal when said voltage is below a preselected minimum level; and
    means for delivering said logic control signal to said oscillator disabling means to cause disabling of said oscillator whereby said gating signals will not be generated.

24. The apparatus of claim 15 further comprising:
    means for disabling said oscillator means;
    means for sensing the magnitude of the output voltage of the direct current source and for generating a logic control signal when said voltage is below a preselected minimum level; and
    means for delivering said logic control signal to said oscillator disabling means to cause disabling of said oscillator whereby said gating signals will not be generated.

* * * * *